July 22, 1924.  
E. E. GREVE  
1,501,995  
LUBRICATING DEVICE FOR REVERSING CLUTCH MECHANISM  
Filed Dec. 20, 1921
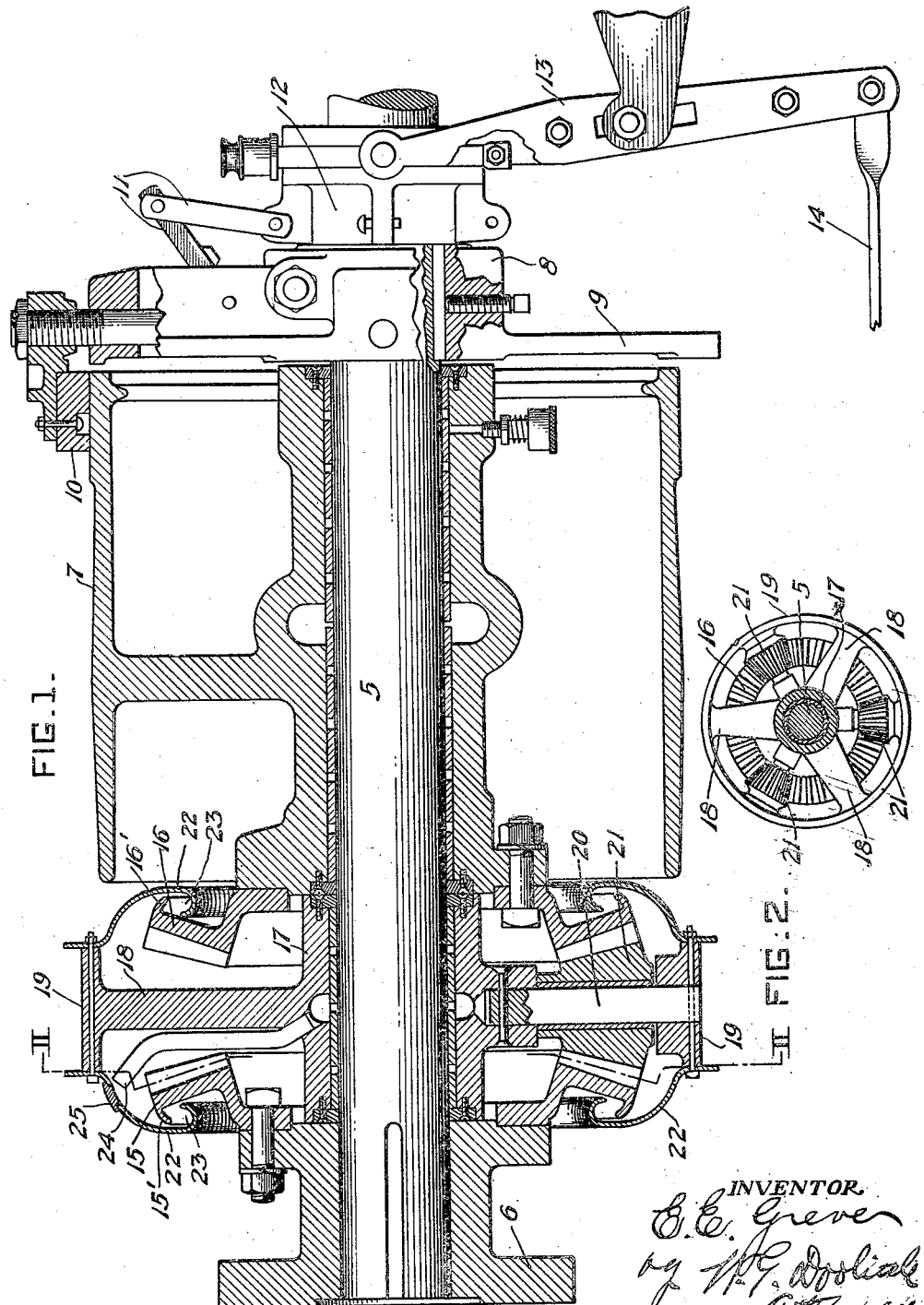
INVENTOR Patented July 22, 1924.

1,501,995

UNITED STATES PATENT OFFICE.

EDGAR E. GREVE, OF BELLEVUE, PENNSYLVANIA.

LUBRICATING DEVICE FOR REVERSING CLUTCH MECHANISM.

Application filed December 20, 1921. Serial No. 523,611.

*To all whom it may concern:*

Be it known that I, EDGAR E. GREVE, a citizen of the United States, residing at Bellevue, in the county of Allegheny and State of Pennsylvania, have invented certain new and useful Improvements in a Lubricating Device for Reversing Clutch Mechanism, of which the following is a specification.

This invention relates to a lubricating device for a reversing clutch mechanism.

The present invention has for its object to provide a bath of lubricant in which the planetary gears of the reversing gearing may operate, and to so construct and arrange the lubricating means as to prevent loss of the lubricant without the use of packings or other relatively complicated arrangements, and without material change in the mechanical and constructional design of the machine.

My invention may be understood by reference to the accompanying drawings, in which:

Fig. 1 is a vertical longitudinal section through the reversing clutch;

Fig. 2 is a vertical transverse section in the plane of line II—II of Fig. 1, but on a smaller scale.

In the drawings, shaft 5 is a driven shaft which may be rotated in any suitable way. As shown, it has a coupling member 6 at one end thereof for attachment to the hub of the fly wheel (not shown) of an engine. The shaft 5 carries a pulley 7 which is loose thereon and which is spaced away from the coupling member 6. At one end of the pulley is the clutch mechanism for connecting the pulley with the shaft when the two are to be rotated in the same direction. This clutch mechanism comprises no part of the present invention, but includes a hub member 8 keyed or otherwise fixed on the shaft and from which extends a radial plate 9. The plate carries brake block 10 arranged to be moved into and out of driving relation with pulley 7 by means of toggle links 11 connected with sleeve 12 splined to the shaft 5 and reciprocated by a feather through lever 13 operated in any suitable way by link 14.

Disposed between the coupling 6 and the other end of the pulley is the reversing gearing. It comprises a bevel gear wheel 15 bolted to the coupling member 6, as indicated, or otherwise fixed to rotate with the shaft. Bolted or fixed to the face of pulley 7 is a similar bevel wheel 16. Interposed between the two bevel wheels is a frame or spider in the form of a wheel having a hub 17, webs or spokes 18, and a peripheral flange 19. This wheel is loose on the shaft 5. Rotatable on radially arranged shafts 20 between the spokes 18 are one or more bevel gear pinions 21 which mesh with bevel gears 15 and 16. A brake, not shown, is adapted to engage the peripheral flange 19 to hold it against rotation.

This gearing, so far as described, is old in the art. In operation, if the brake block 10 is in gripping relation with the pulley, and the brake on the periphery 19 of the wheel which forms part of the planetary gearing is released, pulley 7 revolves with the shaft, the planetary gearing revolving with the gear wheels 15 and 16. If, however, brake 10 is released, and the flange 19 held against rotation, motion will be transmitted from gear wheel 15 through pinions 21 to gear wheel 16, revolving it and the pulley on which it is carried in the opposite direction.

My invention proposes an efficient lubricating means for this gearing. To this end, there is bolted at each side of flange 19 a sheet or other metal plate 22 which curves outwardly over the gears 15 and 16, and extends past their peripheries. There is a central opening in these plates, and the metal at the edge of the opening is curled inwardly to form an annular internal trough or channel 23 on each plate. Formed on each of the gears 15 and 16 is an annular lip 15' and 16', respectively, which overhangs the adjacent trough.

If desired, a pipe or tube 24 may be provided through which oil may be poured to lubricate the hub 17 from which it can drain into the oil receiving trough formed by the plates 22 and flange 19. An opening in juxtaposition to the outer end of tube 24 may be provided in one of the plates 22 into which a cap or plug 25 may be screwed.

In operation, a sufficient quantity of lubricant is poured into the gearing so that it will have a suitable depth in the receptacle or casing provided by the plates 22 and the flange 19. When the gearing is in operation to rotate pulley 7 in a direction corresponding to the direction of rotation of shaft 5, the flange 19 and pinions 21 revolve with the shaft. If revolving at a low speed, the lubricant will always seek the bottom of the lubricant receiving trough and the pinions and the different parts of the gearing will successively be partially immersed. At a higher speed, the oil will travel around the trough, due to centrifugal action. If the flange 19 and its associated parts are locked to reverse the direction of rotation of the pulley, the oil will be dipped up by the revolving gears 15 and 16 and carried to other parts of the gearing not immersed, or thrown out centrifugally against flange 19 where it will gravitate to such gearing. The lips 15' and 16' of the gears 15 and 16, respectively, serve to drain any oil from the periphery of the said two gears into the troughs 23 in which it flows by gravity back into the lower part of the main trough provided by the side plates 22 and flange 19. This prevents the oil from flowing over the gears out onto the adjacent mechanism, such as the outside of the hub of the pulley or the coupling member.

An efficient and simple method of lubricating the planetary gearing is provided without material change in the design of the mechanism.

The particular mechanism shown is one that is common in power plants for oil and gas well drilling rigs, but is applicable to other uses.

I claim as my invention:

1. The combination with a reversing gear having opposed gear members with interposed planetary gearing, of a revoluble casing surrounding the gear, which casing has annular side flanges thereon, said flanges having reversely formed inwardly extending annular channels thereon within the periphery of the opposed gear members.

2. The combination with a reversing gear having opposed gear members with planetary gearing interposed between them, of a casing spaced from said gears and providing a trough for a lubricant, and an annular channel having vertically extending side walls for catching lubricant and returning it to the lowermost portion of said trough.

3. The combination with a reversing gear having opposed gear members with planetary gearing interposed between them, a frame on which the planetary gearing is carried, of means secured to the frame providing an annular trough for the reception of lubricant, said means including side plates having a central aperture secured to the frame and extending inwardly beyond the peripheries of the opposed gear members, said plates each provided with a channel and cooperating with the gears for returning lubricant to the annular trough.

4. The combination with a reversing gear having opposed gear members with planetary gearing interposed between them, a frame on which the planetary gearing is carried, of means secured to the frame providing an annular trough for the reception of lubricant, said means including a pair of centrally apertured side plates secured to the said frame and extending inwardly past the peripheries of the opposed gear members, each of said plates having a relatively small internal annular channel formed thereon, and means on each of the opposed gear members which extend over the adjacent internal channel from which lubricant may drain into the channels.

5. The combination with a reversing gear having opposed gear members with planetary gearing interposed between them, a frame on which the planetary gearing is carried, of means secured to the frame providing an annular trough for the reception of lubricant, said means including a pair of centrally apertured side plates secured to said frame and extending inwardly past the peripheries of the opposed gear members, each of said plates having an inturned edge surrounding the central aperture to provide an annular channel, and an annular lip on each opposed gear member projecting over the adjacent annular channel from which lubricant may drain into the channels to be returned to the main trough provided by the plates and frame.

6. The combination with a shaft having a pulley loosely mounted thereon, a reversing gear for rotating the pulley in a direction opposite the direction of rotation of the shaft including a bevel gear wheel secured to the pulley, a similar opposed gear wheel carried by suitable means on the shaft, a rotatable frame having a hub and a flange rotatable about the shaft between the opposed bevel gear wheels, a radially arranged pinion on said frame between the hub and flange meshing with both of said opposed gear wheels, of a centrally apertured plate secured to each side of the flange and enclosing the peripheries of the opposed gear wheels for providing, with the flange, an annular lubricant receiving trough, and means forming an annular channel for receiving lubricant from the gears and returning it to the trough.

7. The combination with a shaft having a pulley loosely mounted thereon, a reversing gear for rotating the pulley in a direction opposite the direction of rotation of the shaft including a bevel gear wheel secured to the pulley, a similar opposed gear wheel carried by suitable means on the shaft, a rotatable frame having a hub and a flange rotatable about the shaft between the opposed bevel gear wheels, a radially arranged pinion on said frame between the hub and flange meshing with both of said opposed gear wheels, an annular lip on the outer face of each of the opposed gear wheels, of a centrally apertured plate secured to each side of the flange and enclosing the peripheries of the opposed gear wheels for providing, with the flange, an annular lubricant receiving trough, and means on the inner faces of each plate extending under the annular lip on the opposed gear wheels for providing an annular channel into which lubricant may drain from the annular lip into the lubricant receiving trough.

8. The combination with a shaft having a pulley loosely mounted thereon, a reversing gear for rotating the pulley in a direction opposite the direction of rotation of the shaft including a bevel gear wheel secured to the pulley, a similar opposed gear wheel carried by suitable means on the shaft, a rotatable frame having a hub and a flange rotatable about the shaft between the opposed bevel gear wheels, a radially arranged pinion on said frame between the hub and flange meshing with both of said opposed gear wheels, of a centrally apertured plate secured to each side of the flange and enclosing the peripheries of the opposed gear wheels for providing, with the flange, an annular lubricant receiving trough, and a tube extending from said hub outwardly toward the flange, said tube terminating within the lubricant receiving trough and serving to conduct lubricant to the hub of said frame.

In testimony whereof I affix my signature.

EDGAR E. GREVE.